United States Patent
Haglund

[11] Patent Number: 6,164,720
[45] Date of Patent: Dec. 26, 2000

[54] SEAT BACK SUPPORT MECHANISM

[75] Inventor: Lennart Haglund, Vågårda, Sweden

[73] Assignee: Autoliv Development AB, Vårgårda, Sweden

[21] Appl. No.: 09/242,409

[22] PCT Filed: Aug. 15, 1997

[86] PCT No.: PCT/SE97/01352

§ 371 Date: Sep. 24, 1999

§ 102(e) Date: Sep. 24, 1999

[87] PCT Pub. No.: WO98/07589

PCT Pub. Date: Feb. 26, 1998

[30] Foreign Application Priority Data

Aug. 16, 1996 [GB] United Kingdom ............... 9617186

[51] Int. Cl.[7] ............................................ B60N 2/42
[52] U.S. Cl. ................................. 297/216.1; 297/378.12
[58] Field of Search ......................... 297/216.13, 216.14, 297/216.15, 216.1, 378.11, 378.12

[56] References Cited

U.S. PATENT DOCUMENTS

| | | |
|---|---|---|
| 4,145,081 | 3/1979 | Withers . |
| 4,195,881 | 4/1980 | Kluting et al. ............... 297/216.13 |
| 5,219,202 | 6/1993 | Rink et al. . |
| 5,290,089 | 3/1994 | Oleszko et al. . |
| 5,366,268 | 11/1994 | Miller et al. ............... 297/216.1 |
| 5,697,478 | 12/1997 | Di Stefano ............... 297/216.1 X |
| 5,743,592 | 4/1998 | Bedouch ............... 297/216.1 X |
| 6,024,406 | 2/2000 | Charras et al. ............... 297/216.14 |

FOREIGN PATENT DOCUMENTS

| | | |
|---|---|---|
| 0651957A1 | 5/1995 | European Pat. Off. . |
| 0709249A2 | 5/1996 | European Pat. Off. . |

Primary Examiner—Peter M. Cuomo
Assistant Examiner—Stephen Vu
Attorney, Agent, or Firm—Venable; George H. Spencer; Robert Kinberg

[57] ABSTRACT

A back support mechanism for supporting the back of a seat in a motor vehicle, wherein the seat back support mechanism includes at least one first component adapted to be connected to the squab of the seat or to a frame supporting the squab of the seat, and at least one further component adapted to be connected to the back of the seat. A connection between the components includes a linkage to permit the further component to move with first and second pivotal actions relative to the first component. The linkage includes two pivot link elements which are respectively mounted to effect a pivotal movement relative to the at least one first component. The pivot link elements directly or indirectly support the further component. The pivot link elements permit the further component to effect an initial rearward pivotal movement which constitutes the first pivotal action before effecting the second pivotal action. The connection includes a deformable element which resists the second pivotal action. The deformable element is adapted to deform to permit the second pivotal action when subjected to a force in excess of a predetermined threshold.

12 Claims, 3 Drawing Sheets

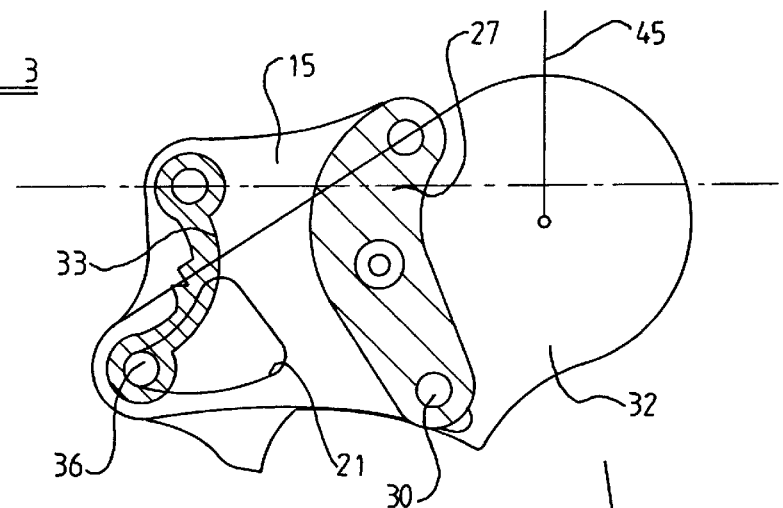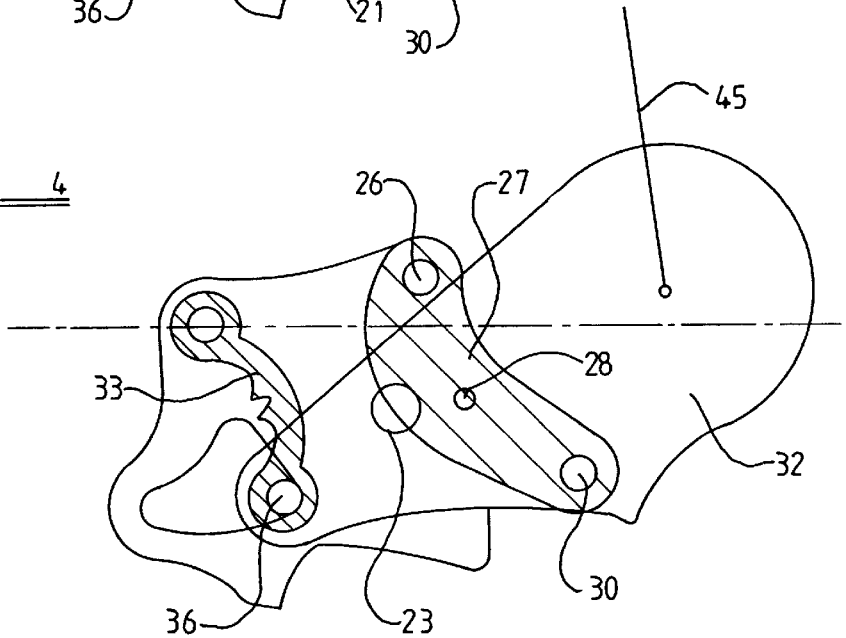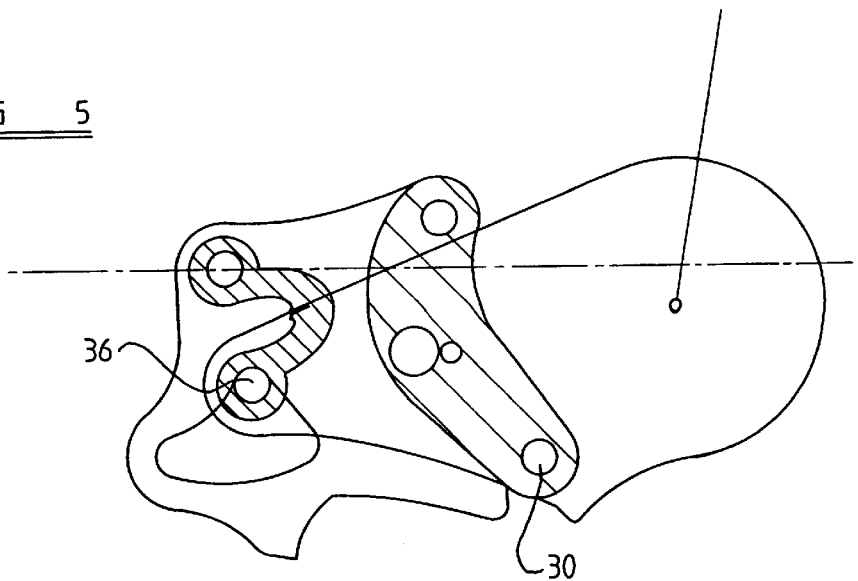

SEAT BACK SUPPORT MECHANISM

BACKGROUND OF THE INVENTION

The present invention relates to a seat back support mechanism and more particularly, relates to a seat back support mechanism for supporting the back of a seat intended to be mounted in a vehicle. A preferred seat back support mechanism in accordance with the invention may incorporate a recliner mechanism.

When a vehicle with a conventional seat is involved in a rear impact, the seat may be accelerated with a substantial forward acceleration since the seat is secured to the floor of the vehicle. The posterior and torso of an occupant of the vehicle sitting on the seat will consequently be accelerated, because of the intimate contact between the seat, and the back of the seat, and the posterior and torso of the occupant. The head of the occupant, however, is not in direct contact with the seat and, due to its inertia, will tend to remain stationary. Since the posterior and torso are being accelerated forwardly, this means that effectively the head of the occupant may move rearwardly relative to the torso, thus bending the neck of the occupant. This can cause injury to the occupant.

It is now believed that the risk of injury to an occupant of a vehicle can be diminished if the back of the seat is mounted in such a way that the top part of the seat back can move forwardly to support the head of the occupant and also in such a way that the seat back can subsequently "yield", at least to a predetermined extent, during a rear impact. In this way, the torso of the occupant can be caused to accelerate in a more gradual manner, and the head of the occupant can be supported thus reducing the risk of injury.

SUMMARY OF THE INVENTION

The present invention seeks to provide a seat back support mechanism which is adapted to permit the back of the seat to yield when subjected to a predetermined minimum force.

According to this invention there is provided a back support mechanism for supporting the back of a seat in a motor vehicle, the seat back support mechanism comprising at least one first component adapted to be connected to the squab of the seat or to a frame supporting the squab of the seat, and at least one further component adapted to be connected to the back of the seat, the mechanism comprising a connection between the components, the connection including means to permit the further component to move with a first pivotal action relative to the first component, and also with a second pivotal action relative to the first component, there being an element which resists second pivotal action, element being adapted to deform to permit the second pivotal action when subjected to a force in excess of a predetermined threshold.

Preferably the element is of arcuate form, each of the opposed ends of the element being connected to a respective one of components, the two ends being adapted to be moved towards one another, with a consequent collapsing of the arcuate element, as the further component effects the second pivotal movement relative to the first component.

Conveniently the arcuate element is provided with a notch on the interior of the arc to assist in the deformtation of element. The notch may be a "v"-shaped notch.

Advantageously a linkage is provided comprising two pivot link elements, the pivot link elements each being mounted to effect a pivotal movement relative to at least one first component, the pivot link elements directly or indirectly supporting further component, the pivot link elements permitting further component to effect an initial rearward pivotal movement which constitutes first pivotal action before effecting second pivotal action.

Conveniently one of the pivot link elements comprises the deformable element.

Preferably the deformable element is connected by a pivot pin to an integer supporting the further component, the pivot pin extending into a guide aperture which is fixed in position.

Advantageously the integer supporting the further component comprise a recliner support plate which supports a recliner mechanism, the recliner mechanism comprising a support arm which constitutes the further component.

Conveniently release means are provided to prevent premature movement of the pivot links. The release means may comprise a frangible means, adapted to break when subjected to a predetermined force. Alternatively, the release means may comprise mechanically or electro-mechanically operated release means in the form of a retractable locking pin or the like, the retractable locking means being retracted in response to a predetermined acceleration of the vehicle being sensed by an appropriate sensor. The sensor may effect retraction of the retractable pin or may control a solenoid or the like.

Advantageously the means to permit the further component to move with a first and second pivotal action are connected to a support plate which is mounted to effect a pivotal motion relative to the first component, means being provided to lock the support plate in position.

Preferably the means provided to lock the support plate in position comprise a pivotally mounted lever which initially engages the support plate to lock the support plate in position, and is movable to a position in which the lever is disengaged from the support plate to permit a pivoting movement of the support plate.

The invention also relates to a vehicle seat incorporating a seat back support mechanism as described above.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 3 is a plan view of four co-operating parts of the mechanism shown in FIGS. 1 and 2 in a first condition, FIG. 4 is a view corresponding to FIG. 3 showing the four parts in a second condition, and FIG. 5 is a view corresponding to FIGS. 3 and 4 showing the four parts in a third and final condition.

DETAILED DESCRIPTION OF THE INVENTION

Figure 1:
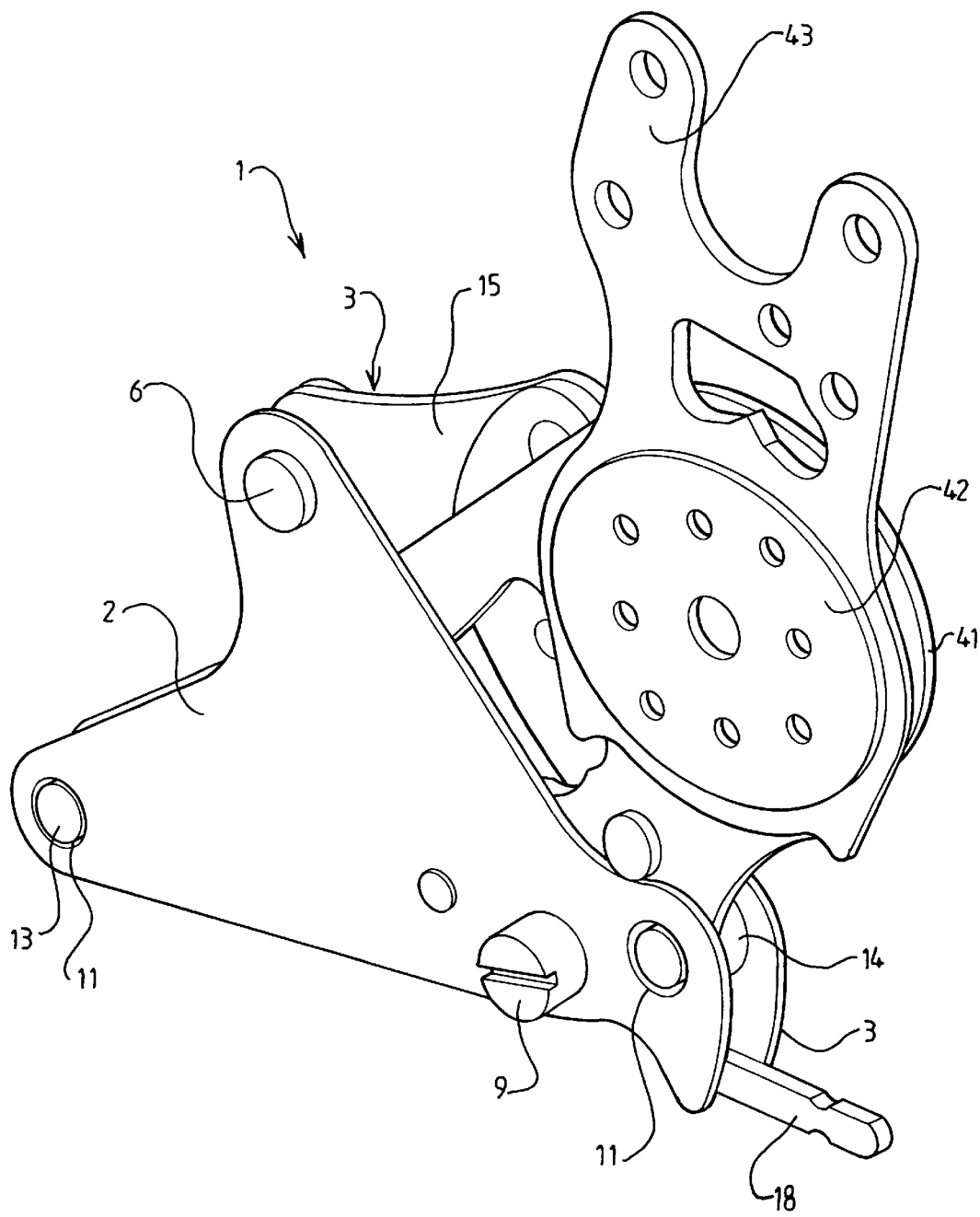
FIG. 1 is a perspective view of a seat back support mechanism accordance with the invention.
Figure 2:
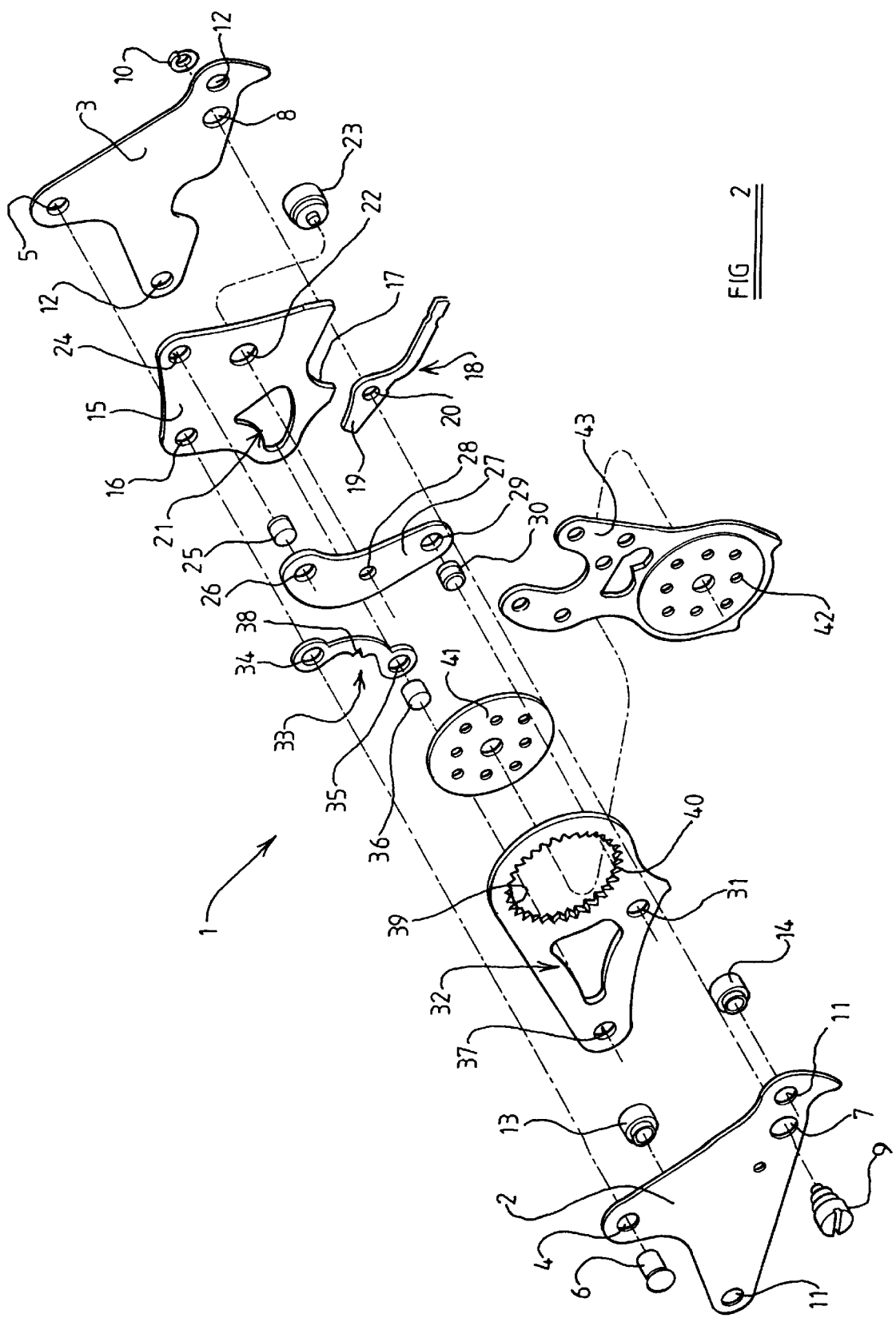
FIG. 2 is an exploded view of the seat back support mechanism of FIG. 1.

Referring initially to FIGS. 1 and 2 of the accompanying drawings, a seat back support mechanism 1 is adapted to be mounted between the squab of the seat, or a frame supporting the squab of the seat, which is connected to the floor of the motor vehicle, and the back of the seat. The mechanism is adapted to provide a "recliner" effect and is also provided with means which can be actuated to permit the back of the seat to be tilted forwardly, which may prove convenient if, for example, the seat is the front seat in a two-door motor car. As will be described, the support mechanism is so designed, that during a rear impact, the back of the seat may effect a first movement relative to the squab of the seat, if the force applied to the back of the seat exceeds a certain limit in which the lower part of the back of the seat moves rearwardly and the top part of the back of the seat moves forwardly. Subsequently the back of the seat may effect a movement, if the force applied to the back of the seat is in excess of a predetermined threshold, during which the back of the seat effectively tilts rearwardly, with the bottom part of the back of the seat remaining substantially stationary and the top part of the back of the seat moving rearwardly.

Considering the components that together constitute the mechanism 1 as illustrated in FIGS. 1 and 2, it is to be understood that the mechanism comprises a front main support plate 2 of substantially triangular form, and a rear main support plate 3 of a substantially corresponding form, the plates 2 and 3 forming the outer parts of the mechanism, the remaining components being located between the outer plates 2 and 3.

The front main support plate 2 is provided with a first aperture 4 co-aligned with a corresponding first aperture 5 formed in the rear main support plate 3. A bearing 6 passes through these apertures and pivotally supports two intermediate components as will be described hereinafter.

The front main support plate 2 defines a further aperture 7 which is co-aligned with a corresponding further aperture 8 formed in the rear main support plate 3. A bolt 9 is provided which passes through the co-aligned apertures 7 and 8, the bolt 9 being associated with a nut 10 located adjacent the rear main support plate 3. One intermediate element is pivotally mounted on a bearing surface provided on the bolt 9, as will be described hereinafter.

The front main support plate 2 defines two further apertures 11, and the rear main support plate defines two further co-aligned apertures 12. Each pair of apertures 11,12 receives a respective spacer element 13,14, the spacer elements being located between the front and rear main support plates.

The front and rear main support plates 2,3 are provided with means to mount the described mechanism in position on the squab of a vehicle seat or on a frame which supports the squab of a vehicle seat.

The bearing 6 pivotally supports an intermediate support plate 15. The intermediate support plate 15 defines a first aperture 16 which receives the bearing 6. The intermediate support plate 15 can thus pivot about an axis defined by the aperture 16 and the bearing 6. The lower part of the intermediate support plate defines a recess 37. A locking lever 18 is provided having a forward end 19 which has an exterior profile corresponding to the profile of the recess 17. The locking lever 18 has formed therein an aperture 20 which is located between the forward end 19 and a protruding handle portion, The aperture 20 of the locking lever 18 receives the bearing on the bolt 9 so the locking lever is pivotally mounted for pivotal rotation about the axis defined by the bolt 9. The locking lever 18 is mounted in a position which is co-planar with the intermediate support plate 15. The locking lever 18 may move from a first position, in which the forward end 19 of the locking lever is snugly received within the recess 17 engaging the intermediate support plate 15, thus preventing rotation of the intermediate support plate 15 in either sense about the axis defined by the bearing 6 and the aperture 16, and a release position, in which the forward end 19 of the locking lever 18 is disengaged from the intermediate support plate 15, thus permitting the intermediate support plate 15 to pivot in a forward direction (i.e. a counter clockwise direction as viewed in FIGS. 1 and 2) about the axis defined by the bearing 6 and the aperture 16. This movement can be effected when it is desired to tilt the back of the seat forwardly.

The intermediate support plate 15 defines a substantially triangular guide aperture 21, the function of which will become clear from the following description.

The intermediate guide plate 15 defines an aperture 22 which receives part of a release element 23, the function of which will become clear from the following description.

The intermediate support plate 15 defines a further aperture 24 which receives a pivot pin 25 which is also received in an aperture 26 formed in one end of an elongate pivot link 27. The link 27 is thus mounted for pivotal movement about an axis defined by the pivot pin 25.

The pivot link 27 is of elongate form. At the centre of the pivot link 27 is an aperture 28. In an initial position of the pivot link, the aperture 28 in the link 27 is co-aligned with the aperture 22 in the intermediate support plate 15. The release element 23 which is engaged with the aperture 22 has a small extending frangible stud which is located in the aperture 28. The stud thus serves to maintain the pivot link 27 in its initial position. The pivot link 27 defines, at the end remote from the aperture 26, a further aperture 29, that further aperture 29 receiving a further pivot pin 30 The pivot pin 30 is received in an aperture 31 formed in a recliner support plate 32. The recliner support plate 32 will be described in greater detail hereinafter.

A second pivot link 33 is provided which effectively co-operates with the first pivot link 27 to provide a parallel linkage between the intermediate support plate 15 and the recliner support plate 32. The second pivot link 33 is of arcuate form having a first aperture 34 at one end, which receives the bearing 6, and having a second aperture 35 at the other end, which receives a pivot pin 36, the pivot pin 36 also being received in an aperture 37 provided for that purpose in the recliner support plate 32. It is to be noted, however, that part of the pivot pin 36 extends to the other side of the second pivot link 33 and is received within the triangular guide aperture 21 formed in the intermediate support plate 15.

The second pivot link 33 is of arcuate form, A "V" notch or recess 38 is provided substantially at the mid point of the link on the interior side of the arc.

The recliner support plate 32 comprises a component that is adapted to be connected to the back of a seat and is, of itself, of substantially conventional form, defining an aperture 39 that is provided, about its periphery, with a plurality of inwardly directed teeth 40. The aperture thus effectively forms the ring gear for a planetary gear system. The planetary gear system is mounted between two carrier plates 41,42. The carrier plate 42 is formed integrally with a support arm 43 that is adapted to be connected directly to the frame forming the back of a seat It is to be appreciated that a seat back support mechanism, as described with reference to FIGS. 1 and 2, will be provided on each side of the seat, the support arms 43 engaging two arms of an inverted "U"-shaped frame that forms an essential component of the back of the seat.

It is to be appreciated that the planetary gear mechanism comprising the aperture 39, the carrier plates 41 and 42 and the associated co-operating gears may be provided with an adjusting knob, to enable the degree of inclination of the back of the seat to be adjusted, and is conventional.

It will now be understood more clearly that when the locking lever 18 is moved, by actuating the handle, to a position in which the forward end 19 is disengaged from the recess 17, the intermediate plate 15 can be tilted forwardly, effecting a pivotal motion about the axis defined by the bearing 6. The pivot link 27 is locked to the intermediate plate 15 by the release element 23 and consequently, when the lock lever 18 is disengaged from the intemediate support plate 15, the back of the seat may be tilted forwardly.

Referring now to FIGS. 3 to 5, there is illustrated the relative position of the intermediate support plate 15, the first pivot link 27 and the second pivot link 33 together with the position of the recliner support plate 32. These four components together effect a predetermined movement when a vehicle in which the seat back support mechanism is provided is involved in a rear impact.

FIG. 3 illustrates the four components of interest, when in an initial condition. It is to be observed that the pivot pin 36, at the lower end of the second pivot link 33, is located at a forward position within the generally triangular aperture 21 formed in the intermediate support plate 15. The recliner support plate 32 is in such an orientation that the back of the seat (with the particular adjustment of the recliner mechanism illustrated) is vertical, as indicated by the line 45.

If the vehicle is subjected to a rear impact, a substantial rearwardly directed force is applied to the back of the seat. This initially causes the pivot links 27,33, to commence a rearward pivoting motion. The rearward pivoting motion of the links is only permitted to proceed if the force applied to the back of the seat is sufficiently large to break the frangible part of the release element 23 that is received within the aperture 28 of the first link 27. Thus, if the rear impact is only a very gentle rear impact, the seat remains in its initial condition. However, if the impact is of a predetermined severity, the frangible part will break, thus permitting the pivot links to move. The pivot links then move to the condition illustrated in FIG. 4.

It is to be observed that the pivot pin 36, provided at the lower end of the pivot link 33, has now moved to a rearward position at the bottom of the generally triangular aperture 21 formed in the intermediate support plate 15 The first pivot link 27 has effected a rearward swinging motion about the axis defined by the pivot pin 25 which is received in the aperture 24 of the intermediate support plate 15 and the aperture 26 of the pivot link 27.

As a consequence the recliner support plate 32 has moved rearwardly, and the inclination of the recliner support plate 32 has changed so that the seat back is now inclined slightly forwardly, as can be seen from the orientation of the line 45 in FIG. 4.

It is to be understood that during this movement of the back of the seat, the lower part of the torso of the occupant has effectively engaged the lower part of the back of the seat and moved the lower part of the back of the seat rearwardly. Consequently, the top of the back of the seat is moved forwardly and either the top of the back of the seat or a head-rest carried by the top of the back of the seat will be brought into engagement with the head of the occupant to support the head of the occupant.

Should a continuing rearward force be applied to the back of the seat, that force will tend to pivot the recliner support plate 32 about the axis of the pivot pin 30 which is provided at the lower end of the pivot link 27. This movement with a pivotal action is initially resisted by the second pivot link 33.

However, because the second pivot link 33 is of arcuate form, and especially because of the provision of the "V" notch 38 on the inner surface of the arc, the second pivot link 33 can only withstand a predetermined force tending to compress that pivot link. If the force applied to the back of the seat is beyond a predetermined threshold, the second pivot link 33 will collapse and deform, permitting the recliner support plate 32 to pivot about the axis defined by the pivot pin 30.

It is to be understood that the predetermined threshold for the force that must be applied to the back of the seat to cause the second pivot link to collapse is greater than the force necessary to be applied to the back of the seat to cause the frangible part of the release element 23 to break, thus permitting movement of the first pivot link 27.

The pivot pin 36 provided at the lower end of the second pivot link 33 thus moves upwardly, within the triangular aperture 21 formed in the intermediate support plate 15, to occupy a position adjacent the upper-most corner of that triangular aperture. As can be seen in FIG. 5, the second pivot link 33 has collapsed, but it is to be understood that in collapsing, the second pivot link has absorbed energy.

In an alternative embodiment, an additional element may absorb the energy. This element may comprise a spring or other flexible element. In such a case forward movement of the back of the seat after impact has to be prevented. It is to be appreciated also that during the first movement of the back of the seat, an energy absorbing element can be used to absorb energy.

It is to be appreciated that whilst, in the described embodiment, an intermediate support plate 15 is provided, the only real function of the intermediate support plate 15 is to permit a forward-tilting of the entire back of the seat. If a seat back support mechanism is to be provided in a seat which is not present in a two-door car, then the intermediate support plate could be omitted. In such a case, the apertures 21, 22 and 24 could be formed in the rear main support plate 3. The locking lever 18 would also be omitted.

Whilst the release element 23 has been described as being a frangible pin, the release element 23 could constitute a mechanical or electro-mechanical arrangement adapted to retract a pin in response to a signal from an appropriate sensor. The sensor may comprise a sensor adapted to respond to a an acceleration of the vehicle in excess of the predetermined threshold. The sensor may automatically retract a pin which initially engages the aperture 28 in the pivot link 27, thus releasing the pivot link 27. Alternatively, a retractable pin may be retracted by means of a solenoid.

It is to be appreciated that further modifications may be effected to the invention without departing from the scope of the following claims.

What is claimed is:

1. A back support mechanism for supporting the back of a seat in a motor vehicle, the seat back support mechanism comprising: at least one first component adapted to be connected to one of the squab of the seat and a frame supporting the squab of the seat; at least one further component adapted to be connected to the back of the seat; a connection between the components including means to permit the further component to move with a first pivotal action relative to the first component and with at second pivotal action relative to the first component, said means comprising a linkage including two pivot link elements, the pivot link elements each being mounted to effect a pivotal movement relative to said at least one first component, wherein said further component is one of directly supported and indirectly supported by the pivot link elements, the pivot link elements pivoting said further component to effect an initial rearward pivotal movement which constitutes said first pivotal action before effecting said second pivotal action, and said connection including a deformable element which resists said second pivotal action, said deformable element being adapted to deform to permit the second pivotal action when subjected to a force in excess of a predetermined threshold.

2. The mechanism according to claim 1, wherein the deformable element is an arcuate form, having opposite ends, each of the opposite ends of the element being connected to a respective one of said components, the opposite ends of the element being adapted to be moved towards one another, with a consequent collapsing of the arcuate element, is the further component effects said second pivotal movement relative to said first component.

3. The mechanism according to claim 2, wherein the arcuate deformable element includes a notch on the interior of the arc to assist in the deformation of said element.

4. The mechanism according to claim 1 wherein one of the pivot link elements comprises the deformable element.

5. The mechanism according to claim 4, wherein the connection includes an integer supporting the further component and a pivot pin connecting the deformable element to the integer, the pivot pin extending into a guide aperture which is fixed in position.

6. The mechanism according to claim 5 wherein the integer supporting the further component comprises a recliner support plate which supports a recliner mechanism, the recliner mechanism comprising a support arm which constitutes the said further component.

7. The mechanism according to claim 1, wherein the mechanism includes release means arranged to prevent premature movement of the pivot links.

8. The mechanism according to claim 7, wherein the release means comprise a frangible mechanism.

9. The mechanism according to claim 7, wherein the release means is one of mechanically and electro-mechanically operable.

10. The mechanism according to claim 1, further comprising a support plate mounted to effect a pivotal motion relative to said first component and means to lock the support plate in position, wherein said linkage is connected to the support plate.

11. The mechanism according to claim 10 wherein the means provided to lock the support plate in position comprise a pivotally mounted lever which initially engages the support plate to lock the support plate in position, and is movable to a position in which the lever is disengaged from the support plate to permit a pivoting movement of the support plate.

12. The vehicle seat incorporating a support mechanism according to claim 1.

* * * * *